(12) United States Patent
Tanaka et al.

(10) Patent No.: US 11,148,095 B2
(45) Date of Patent: Oct. 19, 2021

(54) RECLAIMING APPARATUS AND METHOD FOR RECLAIMING

(71) Applicant: Mitsubishi Heavy Industries Engineering, Ltd., Kanagawa (JP)

(72) Inventors: Hiroshi Tanaka, Tokyo (JP); Takuya Hirata, Tokyo (JP); Takashi Kamijo, Tokyo (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 141 days.

(21) Appl. No.: 16/635,440

(22) PCT Filed: Oct. 15, 2018

(86) PCT No.: PCT/JP2018/038359
§ 371 (c)(1),
(2) Date: Jan. 30, 2020

(87) PCT Pub. No.: WO2019/078168
PCT Pub. Date: Apr. 25, 2019

(65) Prior Publication Data
US 2020/0368673 A1    Nov. 26, 2020

(30) Foreign Application Priority Data

Oct. 20, 2017  (JP) .............................. JP2017-203726

(51) Int. Cl.
*B01D 53/00* (2006.01)
*B01D 53/14* (2006.01)

(52) U.S. Cl.
CPC ..... *B01D 53/1425* (2013.01); *B01D 53/1456* (2013.01); *B01D 53/1493* (2013.01);
(Continued)

(58) Field of Classification Search
CPC ........ B01D 2251/604; B01D 2252/103; B01D 2252/204; B01D 2257/504;
(Continued)

(56) References Cited

U.S. PATENT DOCUMENTS

2013/0087041 A1* 4/2013 Iijima ................ B01D 53/1425
95/24
2013/0206000 A1  8/2013 Iijima et al.
(Continued)

FOREIGN PATENT DOCUMENTS

JP    2012-236170 A    12/2012
JP    2013-099727 A     5/2013

OTHER PUBLICATIONS

Extended European Search Report in corresponding European Application No. 18868944.2, dated Jul. 21, 2020 (8 pages).

*Primary Examiner* — Sharon Pregler
(74) *Attorney, Agent, or Firm* — Osha Bergman Watanabe & Burton LLP

(57) ABSTRACT

A reclaiming apparatus includes: a reclaimer configured to extract a lean solution that is a part of an acid gas absorbing liquid regenerated in a regenerator in a recovery unit that recovers acid gas components in gas with the acid gas absorbing liquid, and introduce and receive an extracted lean liquid; an alkaline agent supply pipe configured to supply an alkaline agent to an inside of the reclaimer; a water supply pipe configured to supply supply water to the inside of the reclaimer; a recovered steam discharge pipe configured to introduce recovered steam discharged from the reclaimer into the regenerator; a thermometer that measures temperature in the reclaimer; a pressure guage configured to measure pressure in the reclaimer; and a reclaimer controller.

6 Claims, 10 Drawing Sheets

(52) U.S. Cl.
CPC .. *B01D 2252/103* (2013.01); *B01D 2252/204* (2013.01); *B01D 2257/504* (2013.01)

(58) Field of Classification Search
CPC ............ B01D 53/1425; B01D 53/1456; B01D 53/1468; B01D 53/1475; B01D 53/1493
See application file for complete search history.

(56) References Cited

U.S. PATENT DOCUMENTS

2016/0256825 A1    9/2016  Tanaka et al.
2016/0288049 A1*  10/2016  Tanaka .................. B01D 53/78

\* cited by examiner

RECLAIMING APPARATUS AND METHOD FOR RECLAIMING

FIELD

The present invention relates to a reclaiming apparatus that removes a degraded product accumulated in an absorbing liquid that absorbs acid gas in gas and a method for reclaiming.

BACKGROUND

In a thermal power plant or the like that uses a large amount of fossil fuel, flue gas generated by burning fossil fuel in a boiler, coal gasification gas (gasification gas) obtained by gasifying coal, and natural gas include acid gas components (for example, $CO_2$ and $H_2S$). The gas including such acidic components is subjected to gas-liquid contact with, for example, an amine-containing acid gas absorbing liquid in an absorber to absorb the acid gas in the acid gas absorbing liquid and thus the acid gas in the gas is removed to recover.

For example, a method of reusing the acid gas absorbing liquid by absorbing and removing the acid gas in gas such as the flue gas and the gasification gas in an absorber, thereafter releasing the acid gas absorbed in the acid gas absorbing liquid in a regenerator, supplying the regenerated acid gas absorbing liquid to the absorber again to reuse the acid gas absorbing liquid, and using the acid gas absorbing liquid by circulating in a closed circulation system between the absorber and the regenerator is employed.

At a step of recovering the acid gas components (for example, $CO_2$ and $SO_2$) from the flue gas discharged from a boiler and a step of removing the acid gas components (for example, $CO_2$ and $H_2S$) contained in natural gas or coal gasification gas discharged from a gasification furnace or the like, an amine-containing acid gas absorbing liquid to be used generates degraded product including a non-volatile substance called Heat Stable Amine Salt (HSAS) due to a product caused for degradation in a gas to be treated and decomposition of the acid gas absorbing liquid itself.

The degraded product generated due to the acid gas absorbing liquid is highly corrosive and thus a technique is implemented for removing the degraded product in the acid gas absorbing liquid by supplying the acid gas absorbing liquid to a reclaiming apparatus equipped with a reclaimer and returning the absorbent of the acid gas absorbing liquid accompanying with recovered steam to the circulation system, for example.

In this reclaiming operation, when the concentration of the degraded product in the acid gas absorbing liquid circulating in the circulating system exceeds a specific value, a part of the acid gas absorbing liquid circulating in the circulating system is drawn off and supplied to the reclaimer, the degraded product is removed from the acid gas absorption component with separation by adding an alkaline agent to the reclaimer, and the acid gas absorption component is returned to the circulating system. As described above, conventionally, the concentration of the degraded product in the acid gas absorbing liquid circulating in the circulation system is measured, and the operation of the reclaimer is repeatedly carried out depending on this concentration (refer to, for example, Patent Literature 1 and Patent Literature 2).

CITATION LIST

Patent Literature

Patent Literature 1: Japanese Patent Application Laid-open No. 2012-236170
Patent Literature 2: Japanese Patent Application Laid-open No. 2013-99727

SUMMARY

Technical Problem

In the conventional reclaiming operation, the degraded product is concentrated and recovered as a reclaiming residue by heating the absorbing liquid containing the drawn-off degraded product in the reclaimer and the absorption component is returned to the circulation system as recovered vapor. Consequently, a situation where the accumulation of degraded product in the circulation system through which the acid gas absorbing liquid passes can be prevented. However, in the reclaiming operation by a heating and vaporization operation, a part of the absorbing liquid component may remain in the reclaiming residue without vaporizing. Therefore, the absorption component is lost and the absorbing liquid having the equal amount to the lost absorption component, which is relatively expensive, is required to be supplied.

Thus, in the related art, when non-volatile substances accumulated in the absorbing liquid such as contaminants from flue gas and absorbing liquid degraded products are separated from the absorbing liquid by the reclaiming operation and discharged out of the system, a finish reclaiming operation in which the absorption component remaining in the reclaiming residue in the reclaiming apparatus is returned to the circulation system accompanying with the recovered steam by supply of water and steam after the termination of supply of the absorbing liquid including the non-volatile substances to the reclaiming apparatus is carried out.

However, in the conventional finish reclaiming operation, the pressure in the reclaiming apparatus is kept constant and thus the concentration of the absorption component in the reclaiming residue decreases when the finish reclaiming operation is continued. Consequently, a problem of taking time for the finish reclaiming operation arises due to reduction in the absorption vapor pressure.

In view of the above problem, an object of the present invention is to provide a reclaiming apparatus and a method for reclaiming that can reduce the recovery time of the finish reclaiming operation in which the absorption component remaining in the reclaiming residue is recovered after the reclaiming operation for removing the non-volatile substances is terminated.

Solution to Problem

In order to solve the problem, a first embodiment according to the present invention is a reclaiming apparatus including: a reclaimer configured to extract a lean solution that is a part of an acid gas absorbing liquid regenerated in a regenerator in a recovery unit that recovers acid gas components in gas with the acid gas absorbing liquid, and introduce and receive an extracted lean liquid; an alkaline agent supply pipe configured to supply an alkaline agent to an inside of the reclaimer; a water supply pipe configured to supply supply water to the inside of the reclaimer; a recovered steam discharge pipe configured to introduce recovered steam discharged from the reclaimer into the regenerator; a thermometer that measures temperature in the reclaimer; a pressure guage configured to measure pressure in the reclaimer; and a reclaimer controller configured to control pressure in the reclaimer so that temperature in the reclaimer at a timing of terminating introduction of the extracted lean liquid into the reclaimer is determined to be a standard temperature and the standard temperature is maintained when terminating the introduction of the extracted lean liquid into the reclaimer and further recovering an absorption component from a residue in the reclaimer.

A second embodiment according to the first embodiment is the reclaiming apparatus, wherein, in a case where pressure in the reclaimer reaches an upper limit pressure value of operation upper limit of the reclaimer, the reclaimer controller is configured to change a target standard temperature to be lower than the standard temperature and control the pressure in the reclaimer so that the changed standard temperature is maintained.

A third embodiment according to the second embodiment is the reclaiming apparatus, wherein the change in the target standard temperature is determined to be a lower temperature range within a predetermined temperature from the standard temperature in the reclaimer at the time of terminating the introduction of the extracted lean liquid into the reclaimer.

A fourth embodiment according to any one of the first to the third embodiment is the reclaiming apparatus, wherein in a case of a pressurizing type reclaimer, the pressure in the reclaimer is controlled by installing a throttle valve in the recovered steam discharge pipe and controlling the throttle valve.

A fifth embodiment according to any one of the first to the third embodiment is the reclaiming apparatus, wherein in the case of a vacuum type reclaimer, the pressure in the reclaimer is controlled by controlling a pressure reduction unit installed in the recovered steam discharge pipe.

A seventh embodiment is a method for reclaiming including: reclaiming of removing non-volatile components including extracting lean liquid that is a part of an acid gas absorbing liquid regenerated in a regenerator in a recovery unit that recovers acid gas components in gas with the acid gas absorbing liquid, continuously introducing the extracted lean liquid into a reclaimer and receiving the extracted lean liquid, introducing an alkaline agent and supply water and heating, and removing the non-volatile components in the extracted lean liquid while recovering remaining absorption component from the extracted lean liquid as recovered steam; terminating introduction of the extracted lean liquid into the reclaimer; and a finish reclaiming of controlling pressure in the reclaimer so that temperature in the reclaimer at a time of terminating the introduction of the extracted lean liquid into the reclaimer is determined to be a standard temperature and the standard temperature is maintained when the absorption component is further recovered from a residue in the reclaimer.

Advantageous Effects of Invention

According to the present invention, when the remaining absorption component is recovered after terminating the supply of an extracted lean liquid to the reclaimer, the operation time required for recovering the absorption component in the reclaimer residue to the same concentration can be reduced by controlling the pressure in the reclaimer so that the temperature in the reclaimer is maintained at a predetermined standard temperature.

DESCRIPTION OF EMBODIMENTS

The suitable embodiments of the present invention will be described in detail with reference to the attached drawings. The present invention is not limited by these embodiments. In the case of a plurality of embodiments, the present invention also includes configurations configured by combining the respective embodiments.

First Embodiment

Figure 1:
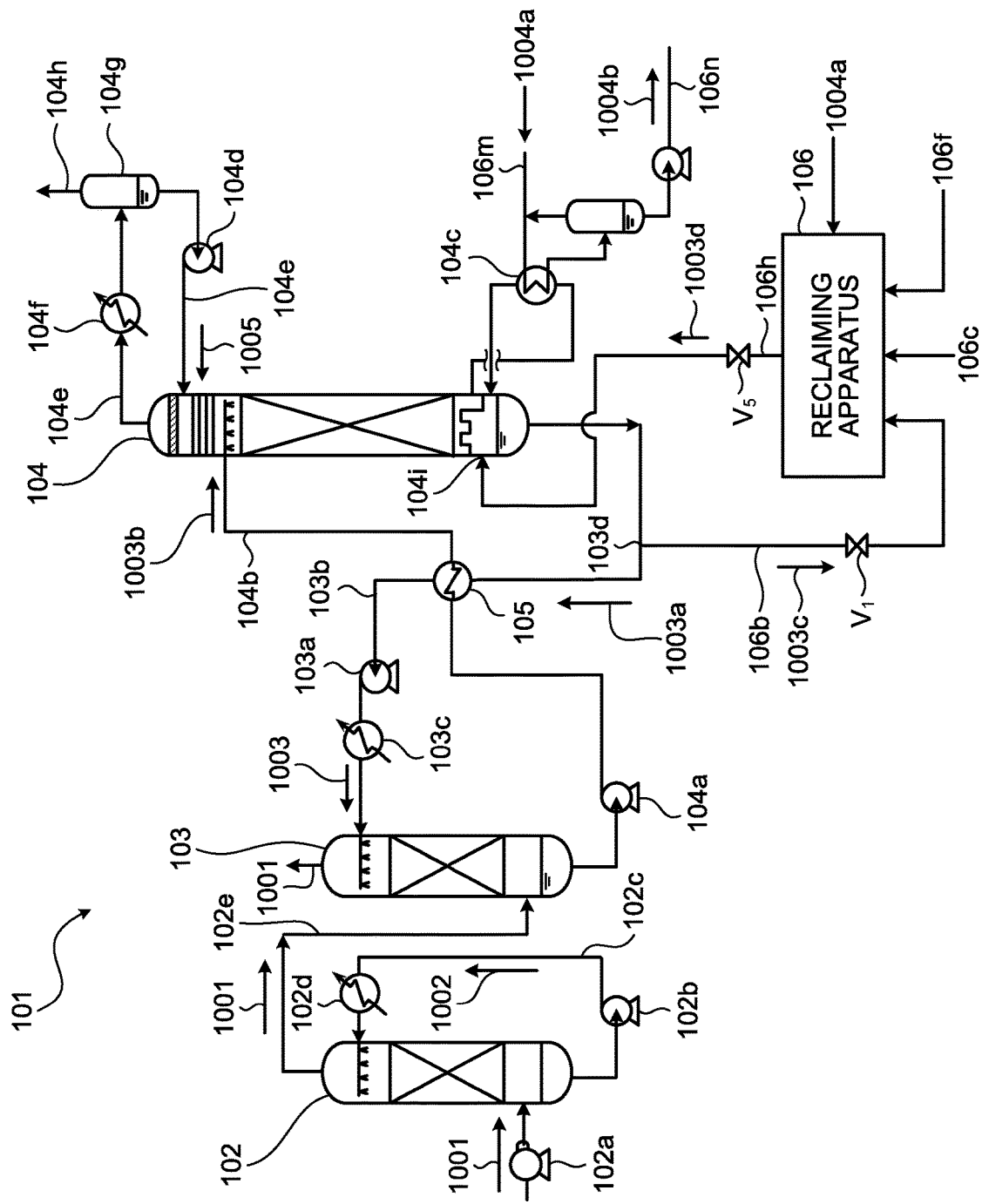
FIG. 1 is a schematic view of a recovery unit according to a first embodiment.

FIG. 1 is a schematic view of a recovery unit according to the first embodiment. Coal gasification gas, synthesis gas, coke oven gas, petroleum gas, natural gas, and the like include acid gas such as $CO_2$ (carbon dioxide) and $H_2S$ (hydrogen sulfide). As illustrated in FIG. 1, the recovery unit for recovering $CO_2$ (carbon dioxide) and $H_2S$ (hydrogen sulfide) or the recovery unit for recovering $CO_2$ (carbon dioxide) from combustion flue gas (hereinafter, referred to flue gas) includes, for example, a cooler 102 for cooling the flue gas 1001 discharged from industrial equipment such as a boiler with cooling water 1002, an absorber 103 for absorbing $CO_2$ in the flue gas 1001 into an absorbing liquid 1003 by countercurrently contacting the absorbing liquid 1003 (lean solution 1003a) with the flue gas 1001, in which the absorbing liquid 1003 is an amine-containing absorbing liquid such as alkanolamine aqueous solution or the like and absorbs $CO_2$, and discharges the flue gas 1001 from which $CO_2$ has been removed, and a regenerator 104 for regenerating the absorbing liquid 1003 (rich solution 1003b) which has absorbed $CO_2$.

In the cooler 102, the pressure of the flue gas 1001 containing $CO_2$ is increased by a flue gas blower 102a and thereafter the flue gas 1001 is fed into the cooler 102. The flue gas 1001 is cooled here by countercurrently contacting with the cooling water 1002 (flue gas cooling step). The cooling water 1002 is stored in the lower part of the cooler 102 and is supplied to the upper part in the cooler 102 through a cooling water pipe 102c located at the outside of the cooler 102 with a humidified cooling water circulation pump 102b. The cooling water 1002 is countercurrently contacted with the flue gas 1001 in the process of reaching to the lower part in the cooler 102. The cooling water pipe 102c is equipped with a condenser 102d for cooling the cooling water 1002. The cooled flue gas 1001 is discharged from the cooler 102 through the flue gas pipe 102e and supplied to the absorber 103.

In the absorber 103, the flue gas 1001 is subjected to countercurrent contact with the absorbing liquid 1003 (lean solution 1003a) using an alkanolamine as a base material to absorb $CO_2$ in the flue gas 1001 into the absorbing liquid 1003. This allows $CO_2$ to be removed from the flue gas 1001 ($CO_2$ removal step). The flue gas 1001 from which $CO_2$ has been removed is discharged from the absorber 103. The absorbing liquid 1003 (lean solution 1003a) is pumped from the regenerator 104 by an absorbing liquid supply pump 103a and supplied from the outside of the absorber 103 through the lean solution pipe 103b to the upper part in the absorber 103. Then, the absorbing liquid 1003 is subjected to countercurrent contact with the flue gas 1001 in the process of reaching to the lower part in the absorber 103. The lean solution pipe 103b is equipped with a condenser 103c for cooling the absorbing liquid 1003 supplied to the absorber 103. The absorbing liquid 1003 (rich solution 1003b) which has absorbed $CO_2$ is stored in the lower part in absorber 103, discharged to the outside of absorber 103 through the rich solution pipe 104b, and supplied to the upper part in the regenerator 104 while pumping with an absorbing liquid discharge pump 104a.

In the regenerator 104, the rich solution 1003b of the absorbing liquid 1003 becomes a semi-lean solution in which most of $CO_2$ has been discharged by endothermic reaction and this semi-lean solution becomes the lean solution 1003a in which almost all $CO_2$ has been removed when the semi-lean solution is about to reach to the lower part in the regenerator 104.

In the lower part of the regenerator 104, the lean solution 1003a is heated and regenerated by saturated steam 1004a with a regenerating heater 104c. Then, the regenerated lean solution 1003a is discharged to the outside of the regenerator 104 through the lean solution pipe 103b, and is cooled by a rich/lean heat exchanger 105 in the process of being supplied to the regenerator 104 with the rich solution 1003b in the process of being supplied to the regenerator 104 through the rich solution pipe 104b (absorbing liquid regeneration step).

On the other hand, in the upper part of the regenerator 104, $CO_2$ gas separated from the rich solution 1003b and the semi-lean solution is discharged from the top part of the regenerator 104 to the outside of the regenerator 104 through the reflux pipe 104e, while contacting with the refluxing water 1005 pumped from the outside of the regenerator 104 by a refluxing water pump 104d. In the process of passing through the reflux pipe 104e, $CO_2$ gas is cooled by the regenerator refluxing condenser 104f. Thereafter, the steam is condensed in a $CO_2$ separator 104g and $CO_2$ is separated from the refluxing water 1005. Consequently, $CO_2$ is introduced to a $CO_2$ recovery step from a recovered $CO_2$ discharge pipe 104h. The refluxing water 1005 separated from $CO_2$ in the $CO_2$ separator 104g is pumped by the refluxing water pump 104d and supplied to the regenerator 104 through the reflux pipe 104e.

Although not illustrated in FIG. 1, on the upstream side of the cooler 102 of the recovery unit 101, a denitration unit that performs a denitration step of reducing $NO_x$ (nitrogen oxide) contained in the flue gas 1001 to carry out the denitration treatment, and a desulfurization unit that performs a desulfurization step of contacting $SO_x$ (sulfur oxide) contained in the flue gas 1001 with calcium carbonate in slurry to carry out the desulfurizing treatment are provided.

In the above-described recovery unit 101, during the operation of recovering $CO_2$ in the flue gas 1001, the alkanolamine is degraded by oxygen to generate the heat stable amine salt. In addition, remaining $NO_x$ which is not removed in the denitration step, remaining $SO_x$ which is not removed in the desulfurization step, and the like react with the alkanolamine included in the absorbing liquid 1003 in the $CO_2$ removal step to generate the heat stable amine salt. This heat stable amine salt is present in the absorbing liquid 1003 as the degraded product together with solid products such as soot and dust contained in the flue gas 1001 and is not removed under ordinary conditions in the absorbing liquid regeneration step of regenerating the lean solution 1003a from the rich solution 1003b. As a result, the degraded product is gradually accumulated in the system by circulating the absorbing liquid 1003 including the degraded product in the system of the recovery unit. Therefore, the recovery unit 101 includes a reclaiming apparatus 106 that reclaims the degraded product remaining in the lean solution 1003a generated in the regenerator 104 as a reclaiming residue 106 (hereinafter, referred to as "residue") formed by heating and concentrating the degraded product. The residue is constituted of solid components formed by concentrating the non-volatile components in the extracted lean liquid 1003c and liquid components not concentrating the non-volatile components.

Figure 2:
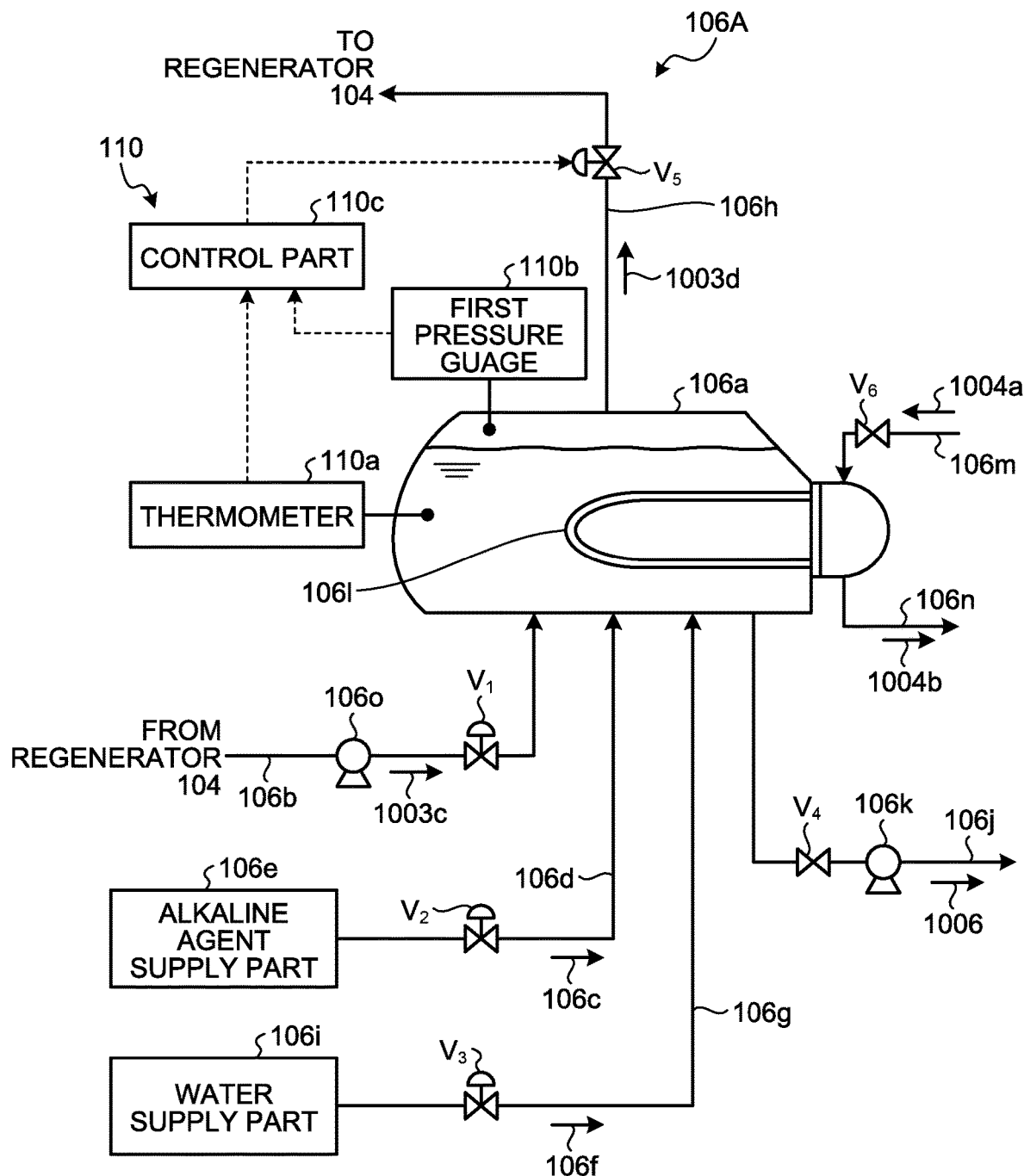
FIG. 2 is a schematic view of a reclaiming apparatus according to the first embodiment.

FIG. 2 is a schematic view of the reclaiming apparatus according to the first embodiment. As illustrated in FIG. 2, the reclaiming apparatus 106A is a pressurizing type reclaiming apparatus and includes a reclaimer 106a for extracting by branching the lean solution 1003a regenerated in the regenerator 104 in the recovery unit 101 for recovering $CO_2$ being the acid gas component in the flue gas 1001 with the absorbing liquid 1003 as the extracted lean liquid 1003c and introducing and receiving the extracted lean liquid 1003c that is extracted; an alkaline agent supply pipe 106d for supplying an alkaline agent 106c to the inside of the reclaimer 106a; a water supply pipe 106g for supplying supplied water (for example regenerator refluxing water (refluxing water), steam condensed water, and demineralized water) 106f to the inside of the reclaimer 106a; a recovered steam discharge pipe 106h for introducing recovered steam 1003d discharged from the reclaimer 106a into the regenerator 104; a thermometer 110a for measuring temperature in the reclaimer 106a; a first pressure guage 110b for measuring pressure in the reclaimer 106a; and a reclaimer controller 110 for controlling pressure in the reclaimer 106a so that a first standard temperature $T_1$ is maintained for further recovering the absorption component from the residue in the reclaimer 106a after terminating the introduction of the extracted lean liquid 1003c to the reclaimer 106a, providing temperature in the reclaimer at a time of terminating introduction of the extracted lean liquid 1003c to the reclaimer 106a is defined as a first standard temperature $T_1$.

The reclaiming apparatus 106A extracts the lean solution 1003a from a branched portion 103d of the lean solution pipe 103b before reaching to the rich/lean heat exchanger 105 from the regenerator 104 as the extracted lean liquid 1003c and receives in the reclaimer 106a, heats the extracted lean liquid 1003c at high temperature (for example, 120° C. to 150° C.) under a pressurized state, and discharges the residue 1006 concentrated by heating, whereas the absorbent vaporized from the extracted lean liquid 1003c is returned as the recovered steam 1003d to the lower part of the regenerator 104.

The reclaiming apparatus 106A mainly includes an absorbing liquid reservoir part and a heating part. As illustrated in FIG. 2, the absorbing liquid reservoir part is configured as a reclaimer 106a as a closed container for receiving the extracted lean liquid 1003c that is a part of the lean solution 1003a regenerated in the regenerator 104 by recovering $CO_2$ from the flue gas 1001. The reclaimer 106a is connected to the branched portion 103d of the lean solution pipe 103b before reaching to the rich/lean heat exchanger 105 from the regenerator 104 through an extraction pipe 106b. The extraction pipe 106b is equipped with an opening and closing valve $V_1$ and the extraction pump 106o.

To the reclaimer 106a, an alkaline agent supply pipe 106d for feeding the alkaline agent 106c from the alkaline agent supply part 106e is connected. The alkaline agent supply pipe 106d is equipped with an opening and closing valve $V_2$. To the reclaimer 106a, a water supply pipe 106g for feeding the supply water 106f from the water supply part 106i is connected. The water supply pipe 106g is equipped with an opening and closing valve $V_3$. To the reclaimer 106a, a residue discharge pipe 106j for discharging the residue 1006 is connected. The residue discharge pipe 106j is equipped with an opening and closing valve $V_4$ and a residue discharge pump 106k. To the upper part of the reclaimer 106a, a recovered steam discharge pipe 106h connected from a connection part 104i at the lower part of the regenerator 104 for discharging the recovered steam 1003d is connected. The recovered steam discharge pipe 106h is equipped with an opening and closing valve $V_5$. Here, examples of the supply water 106f include regenerator refluxing water (refluxing water), steam condensed water, and demineralized water.

The heating unit is located inside the reclaimer 106a and is configured of a lateral U-shaped steam pipe 106l, a steam supply pipe 106m connected to one end of each steam pipe 106l and supplying the saturated steam 1004a generated by heating with a heating source (not illustrated) located outside the reclaimer 106a, and a condensed water discharge pipe 106n connected to the other end of each steam pipe 106l and discharging the steam condensed water 1004b to the outside of the reclaimer 106a.

In the reclaiming apparatus 106A, the extracted lean liquid 1003c is supplied to the inside of the reclaimer 106a by opening the opening and closing valve $V_1$, the alkaline agent 106c is supplied to the inside of the reclaimer 106a from the alkaline agent supply part 106e by opening the opening and closing valve $V_2$, and the supply water 106f is supplied from water supply part 106i by opening the opening and closing valve $V_3$, so that the supplied extracted lean liquid 1003c and the supply water 106f are heated, for example, to 120° C. to 150° C. by non-contact heat exchange. As a consequence, the degraded product that is the non-volatile substance contained in the extracted lean liquid 1003c forms a salt with the alkaline agent 106c and is separated from the absorption component, and thus is concentrated as a residue 1006 at the bottom of the reclaimer 106a.

The residue 1006 includes liquid components in the reclaimer 106a (liquid components including the unseparated absorption component, the alkaline agent, and the supply water or liquid components of non-volatile substances) and the solid components of the non-volatile components. The residue 1006 is discharged to the outside of the reclaimer 106a by opening the opening and closing valve $V_4$ and operating the residue discharge pump 106k and is recovered outside the system of the recovery unit 101. The recovered residue 1006 is treated by incineration or the like.

On the other hand, the extracted lean liquid 1003c and the supply water 106f are vaporized by heating. At this time, the amine-containing absorption component that becomes free by the decomposition with the alkaline agent 106c is vaporized by heating. The recovered steam 1003d accompanying with the vaporized absorbent passes through the opening and closing valve $V_5$ that is opened and is returned to the regenerator 104 through the recovered steam discharge pipe 106h. This allows the degraded product contained in the extracted lean liquid 1003c to be separated and prevents the degraded product from being accumulated in the absorbing liquid circulating in the system of the recovery unit 101.

Here, the principle of reclaiming will be described using the amine-containing absorbing liquid as the absorbent and sodium hydroxide as the alkaline agent. The amine absorption component in a free state is recovered with water as the recovered steam 1003d and the non-volatile substances (impurity: including sodium nitrate and sodium sulfate) are separated and discharged out of the system as the residue (liquid and solid) 1006 by adding and mixing the alkaline agent 106c such as sodium hydroxide to the extracted lean liquid 1003c containing impurities and the absorption component (including amine nitrates and amine sulfates) immobilized with a part of the impurities (for example, including nitrates and sulfates) and heating the resultant mixture.

In the reclaiming operation only by heating as in the related art, a part of the absorption component may remain in the residue without being vaporized from the extracted lean liquid. Therefore, the absorption component may be insufficiently recovered as the recovered steam and the loss of the absorption component is concerned.

Therefore, the reclaiming apparatus 106 of the present embodiment includes the reclaimer controller 110 as illustrated in FIG. 2.

The reclaimer controller 110 includes the thermometer 110a for measuring temperature in the reclaimer 106a, the first pressure guage 110b for measuring pressure in the reclaimer 106a, and a control part 110c for acquiring the data of the thermometer 110a and the first pressure guage 110b and operating the degree of opening of the opening and closing valve $V_5$ located in the recovered steam discharge pipe 106h.

Figure 3:
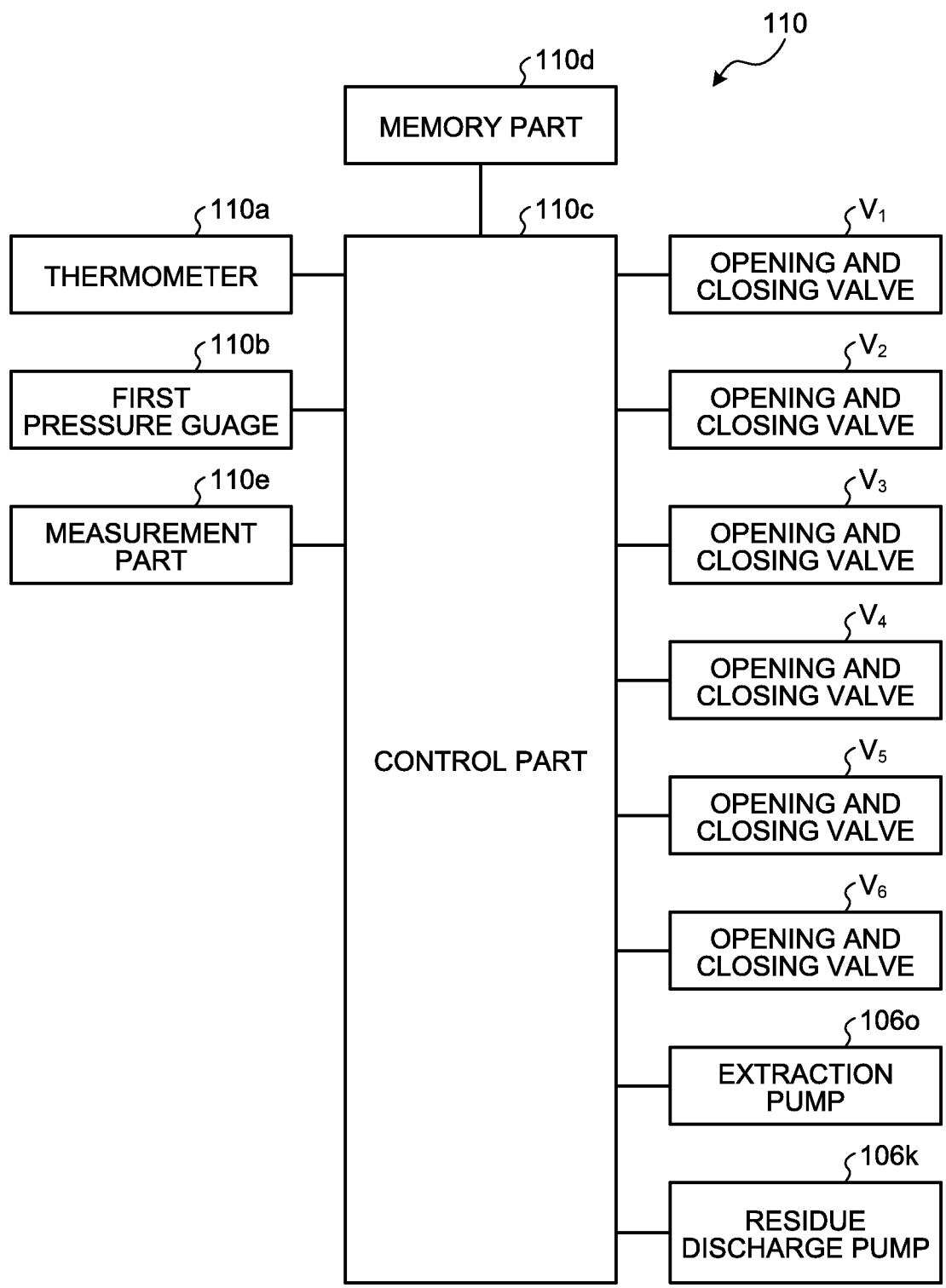
FIG. 3 is a block diagram of the control system of the reclaiming apparatus according to the first embodiment.
Figure 4:
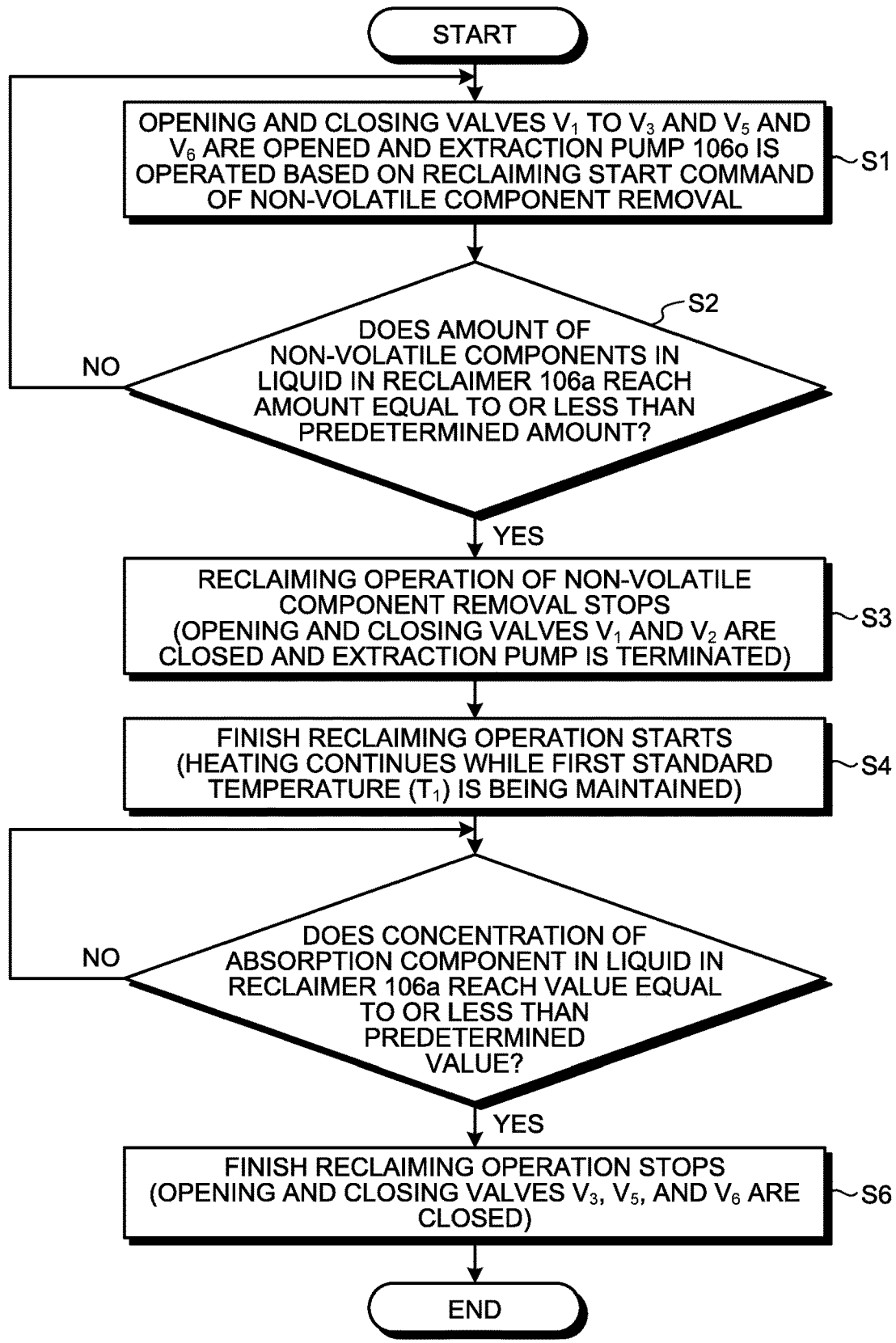
FIG. 4 is a flow chart of the control of the reclaiming apparatus according to the first embodiment.

FIG. 3 is a block diagram of the control system of the reclaiming apparatus according to the first embodiment. FIG. 4 is a flowchart of the control of the reclaiming apparatus according to the first embodiment. The control part 110c is configured of a microcomputer or the like. As illustrated in FIG. 3, the control part 110c is equipped with a memory part 110d. The memory part 110d is configured of RAM, ROM, and the like and stores computer programs and data. In order to operate the reclaiming apparatus 106A, the memory part 110d stores the data of the component amount of the non-volatile substances (impurity: including sodium nitrate and sodium sulfate) in the absorbing liquid (for example, the lean solution 1003a and the extracted lean liquid 1003c) and data of the absorption component amounts (absorption component amount data 1 and absorption component amount data 2) in the extracted lean liquid 1003c received in the reclaimer 106a.

In the case where the content of the non-volatile substances in the lean solution 1003a measured by the measurement part 110e exceeds a predetermined amount (x), an amount from the exceeding amount (x) to the standard value (y) or less (difference x−y=z) is set in the absorption component amount data 1. This setting is an index indicating how much non-volatile substance is removed in the circulating lean solution 1003a and can be set arbitrarily.

In the absorption component amount data 2, for example, the absorption component amount remaining in the extracted lean liquid 1003c is set, and, for example, a predetermined concentration (for example, several percent by weight) of the absorption component or a predetermined recovery amount of the absorption component (recovery ratio) is set. This setting is an index indicating how much absorption component remaining in the extracted lean liquid 1003c received in the reclaimer 106a is decreased and can be set arbitrarily.

In addition, as illustrated in FIG. 3, the thermometer 110a, the first pressure guage 110b, the measurement part 110e, the opening and closing valves $V_1$ to $V_6$, and the pumps 106o and 106k are connected to the control part 110c. In accordance with the computer programs and data previously stored in the memory part 110d, the control part 110c comprehensively controls the above-described opening and closing valves $V_1$ to $V_6$ and pumps 106o and 106k.

As illustrated in FIG. 4, the control part 110c opens the opening and closing valves $V_1$ to $V_3$ and $V_5$ and $V_6$ and operates the extraction pump 106o based on the start command of reclaiming of the non-volatile component removal (Step S1). This causes a part of the absorbing liquid 1003 to be introduced to and received in the reclaimer 106a as the extracted lean liquid 1003c from a part of the lean solution 1003a, the extracted lean liquid 1003c to be heated and vaporized together with the alkaline agent 106c and the supply water 106f and to be returned to the regenerator 104 as the recovered steam 1003d through the recovered steam discharge pipe 106h.

Thereafter, in the case where it is determined that the amount of the non-volatile components in the liquid in the reclaimer 106a reaches equal to or less than the predetermined amount to be removed based on the information of the removal of the non-volatile component input from the measurement part 110e (Yes at Step S2), the control part 110c closes the opening and closing valves $V_1$ and $V_2$ and terminates the extraction pump 106o to stop the reclaiming operation of the non-volatile component removal (Step S3). The concentration of the absorption component in the reclaimer 106a at the time of the stop of reclaiming of the non-volatile component removal varies depending on the type of absorption component and the operating conditions of the absorbing unit. The concentration is preferably a concentration similar to the concentration of the lean solution 1003a circulating in the system (for example, 30% by weight to 60% by weight) or a slightly lower concentration than the concentration of the circulating lean solution 1003a from the viewpoint of absorption component recovery.

Subsequently, based on the start command of the finish reclaiming for recovering the absorption component from the residue 1006, the opening and closing valves $V_3$, $V_5$, and $V_6$ are kept open and the first standard temperature $T_1$ at the time of terminating the extraction of the extracted lean liquid 1003c is measured with the thermometer 110a. Heating is continued by maintaining this first standard temperature $T_1$ (Step S4). The control part 110c controls the pressure inside of the reclaimer 106a based on the first standard temperature $T_1$ in the reclaimer 106a by PID (proportional-integral-differential controller) control.

Decrease in the absorption component amount remaining in the residue causes decrease in the absorption vapor pressure. At this time, the decrease in the absorption vapor pressure can be prevented by increasing the pressure so as to maintain the first standard temperature $T_1$. Here, the pressure is increased, as an example, by partially closing the opening and closing valve $V_5$ based on the instruction from the control part 110c.

In this finish reclaiming operation, in the case where the concentration of the absorption component in the liquid in the reclaimer 106a reaches the predetermined concentration (for example, several percent by weight) or lower (Yes at Step S5), the opening and closing valves $V_3$, $V_5$, and $V_6$ are closed to stop the finish reclaiming operation (Step S6). After the finish reclaiming operation is stopped, the opening and closing valve $V_4$ is opened and the residue discharge pump 106k is operated to discharge the residue 1006 outside the reclaimer 106a.

Figure 5A:
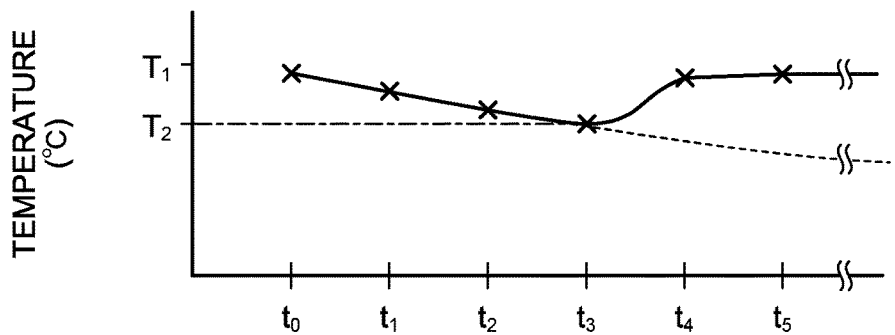
FIG. 5A is a relation view between the finish reclaiming operation time and temperature.
Figure 5B:
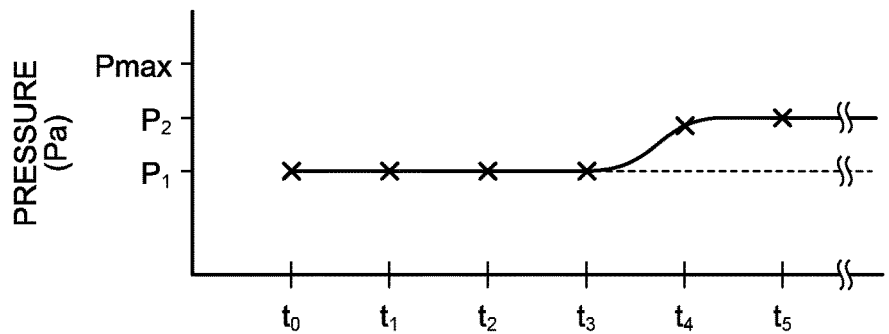
FIG. 5B is a relation view between the finish reclaiming operation time and pressure.
Figure 5C:
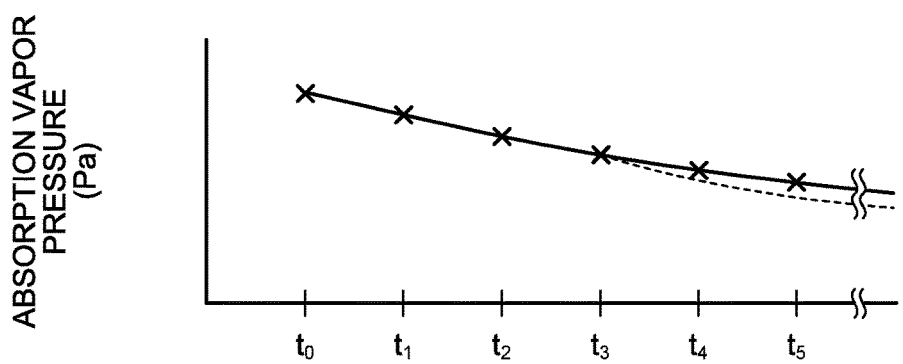
FIG. 5C is a relation view between the finish reclaiming operation time and absorption vapor pressure.
Figure 5D:
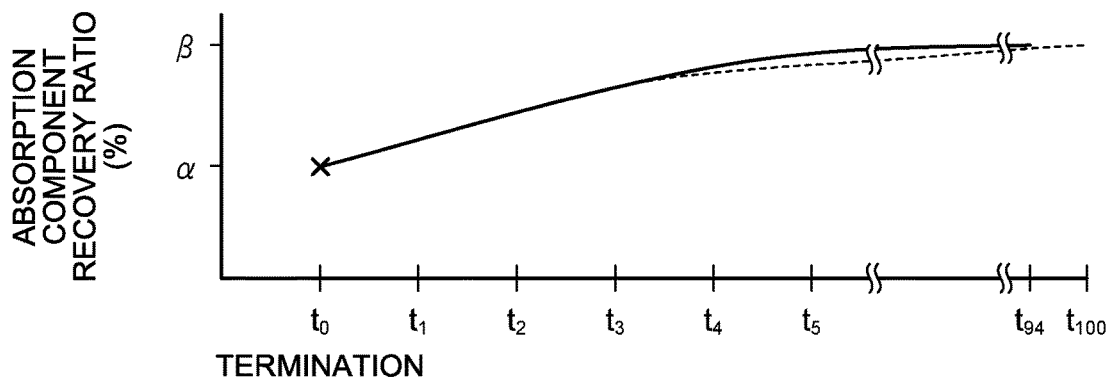
FIG. 5D is a relation view between the finish reclaiming operation time and an absorption component recovery ratio.

Here, the difference between the case of operation in constant pressure in the reclaimer 106a, which is the operation of the related art and the case of operation by maintaining the standard temperature as used in the present invention will be described. In FIG. 5 (FIG. 5A to FIG. 5D), the time $t_0$ in the horizontal axis represents the time when the reclaimer extraction liquid is terminated and the times $t_1$ to $t_5$ represent the elapsed times of the operation of the finish reclaiming operation. FIG. 5A is a relation between the finish reclaiming operation time and the temperature. The vertical axis represents the temperature (° C.) in the reclaimer. FIG. 5B is a relation between the finish reclaiming operation time and the pressure. The vertical axis represents the pressure (Pa) in the reclaimer. FIG. 5C is a relation between the finish reclaiming operation time and the absorption vapor pressure. The vertical axis represents the absorption vapor pressure (Pa) in the reclaimer. FIG. 5D is a relation between the finish reclaiming operation time and the absorption component recovery ratio. The vertical axis represents the absorption component recovery ratio (%).

As illustrated in FIG. 5, discharge of the remaining absorption component from the residue 1006 in the reclaimer 106a accompanying with the recovered steam causes decrease in the absorption vapor pressure associating with the discharge of the absorption component in the case where the internal pressure of the reclaimer is kept constant as in the related art (dashed line in FIG. 5B: maintaining $P_1$ pressure). As a result, in the conventional operation, the temperature of the liquid component in the reclaimer 106a is significantly lowered from the temperature at termination $T_1$ to lower than the temperature $T_2$ (dashed line in FIG. 5A: temperature drop).

Therefore, when the temperature is lowered (temperature $T_2$, at the time of operation time $t_3$), the pressure is controlled (specifically, the opening and closing valve $V_5$ is partially closed) to increase the internal pressure, whereby the pressure is increased (solid line in FIG. 5B ($P_1$ to $P_2$)) and the decrease in the absorption vapor pressure is prevented (solid line in FIG. 5C: preventing decrease in vapor pressure).

Thus, when the "finish reclaiming operation" that recovers the absorption component remaining after terminating the supply of the extracted lean liquid 1003c to the reclaimer 106a, is carried out, about 6% of the operation time required for recovering the absorption component in the residue 1006 in the reclaiming apparatus 106A to the same concentration (for example, 90% of the absorption component is recovered) can be reduced in the case where the pressure of the reclaimer 106a is controlled (the opening and closing valve $V_5$ is partially closed and the pressure is increased from $P_1$ to $P_2$) so that the temperature of the reclaimer 106a is maintained at the predetermined value (the first standard temperature $T_1$), as compared to the case where the constant pressure condition ($P_1$: constant) is used as in the related art without carrying out pressure control using the reclaimer temperature as a standard.

The first standard temperature $T_1$ varies depending on the concentration of the absorption component remaining in the extracted lean liquid 1003c that is continuously introduced in the reclaimer 106a. For example, the first standard temperature $T_1$ is in the range of 120° C. to 130° C.

In order to maintain the predetermined temperature, the change in the temperature lowering from the first standard temperature $T_1$ to the second standard temperature $T_2$ is preferably within the range of 10° C. or less. The temperature lowering of more than 10° C. is not preferable due to less contribution to the reduction in the operation time for improving the recovery ratio. The temperature of the saturated steam 1004a at this time is about 140° C. to about 150° C.

More specifically, as illustrated in FIG. 5D, when the target recovery ratio (the target recovery ratio β) is assumed to be achieved at the operation time $t_{100}$ (dashed line in FIG. 10D) in the related art, the target recovery ratio (β) can be achieved at the operation time $t_{94}$ (solid line in FIG. 10D) providing the initial recovery ratio at the start of the finish reclaiming operation is determined to be α.

For example, in the case where the reclaiming operation for removing the non-volatile substances takes a few days or more, shortening of the finish reclaiming operation allows the efficiency of the entire operation of the reclaiming operation to be improved.

Here, when the pressure is controlled by partially closing the opening and closing valve $V_5$ so that the first standard temperature $T_1$ is maintained at the target temperature, the pressure of the reclaimer 106a gradually increases and thus the pressure may reach the predetermined upper limit value of the operation pressure of the reclaimer 106a. In this case, before the pressure reaches the pressure upper limit value, the reclaimer controller 110 preferably controls so that the target first standard temperature $T_1$ is slightly lowered to change to the second standard temperature $T_2$ (120° C. to 115° C.) and further, the second standard temperature $T_2$ is kept constant. This allows the stable operation without exceeding the predetermined upper limit value of the operation pressure of the reclaimer 106a.

The lowering of the target temperature is preferably within the temperature range of the predetermined temperature (for example, 10° C.) from the first standard temperature $T_1$. This is because the target temperature which is lower than the predetermined temperature does not contribute to the reduction in the operation time of the recovery.

The method for reclaiming in this first embodiment includes carrying out the reclaiming operation for removing the non-volatile substances and carrying out the finish reclaiming operation for terminating the introduction of the extracted lean liquid into the reclaimer and removing the remaining absorbing liquid while maintaining the standard temperature at the termination.

Specifically, the method for operating the reclaiming apparatus 106A of the first embodiment includes the steps of 1) removing the non-volatile components (nitrates and sulfates) in the extracted lean liquid 1003c as the residue 1006 by extracting a part of the lean solution 1003a, introducing the extracted lean solution 1003a as the extracted lean liquid 1003c into the reclaimer 106a, supplying the alkaline agent 106c and the supply water 106f, and heating by the heating source; 2) terminating the continuous introduction of the extracted lean liquid 1003c into the reclaimer 106a after it is determined that the desired amount of the non-volatile components is removed from the extracted lean liquid 1003c; 3) accompanying the absorption component vaporized product in the recovered steam 1003d while continuously supplying the supply water 106f in order to recover the absorption component remaining in the residue 1006; and 4) at the time of accompanying the vaporized product, not maintaining the constant pressure as in the related art but setting the desired temperature (the first standard temperature $T_1$ at the time of terminating the introduction) in the reclaimer 106a and controlling the pressure in the reclaimer 106a so as to maintain this first standard temperature $T_1$.

At the time of the finish reclaiming operation, decrease in the absorption vapor pressure is prevented and recovery speed of the absorption component is increased by controlling the temperature so that the standard temperature is maintained based on the target temperature of the first standard.

According to this method for reclaiming, the time for the finish reclaiming operation can be shortened and the reclaiming operation cost can be reduced by carrying out the reclaiming operation of the non-volatile substance removal for removing the non-volatile substances that are degraded products contained in the extracted lean liquid 1003c and carrying out the finish reclaiming operation for terminating the introduction of the extracted lean liquid 1003c to the reclaimer 106a and preventing the lowering of the absorption vapor pressure when the component of the absorption component remaining in the non-volatile components is recovered.

Figure 6:
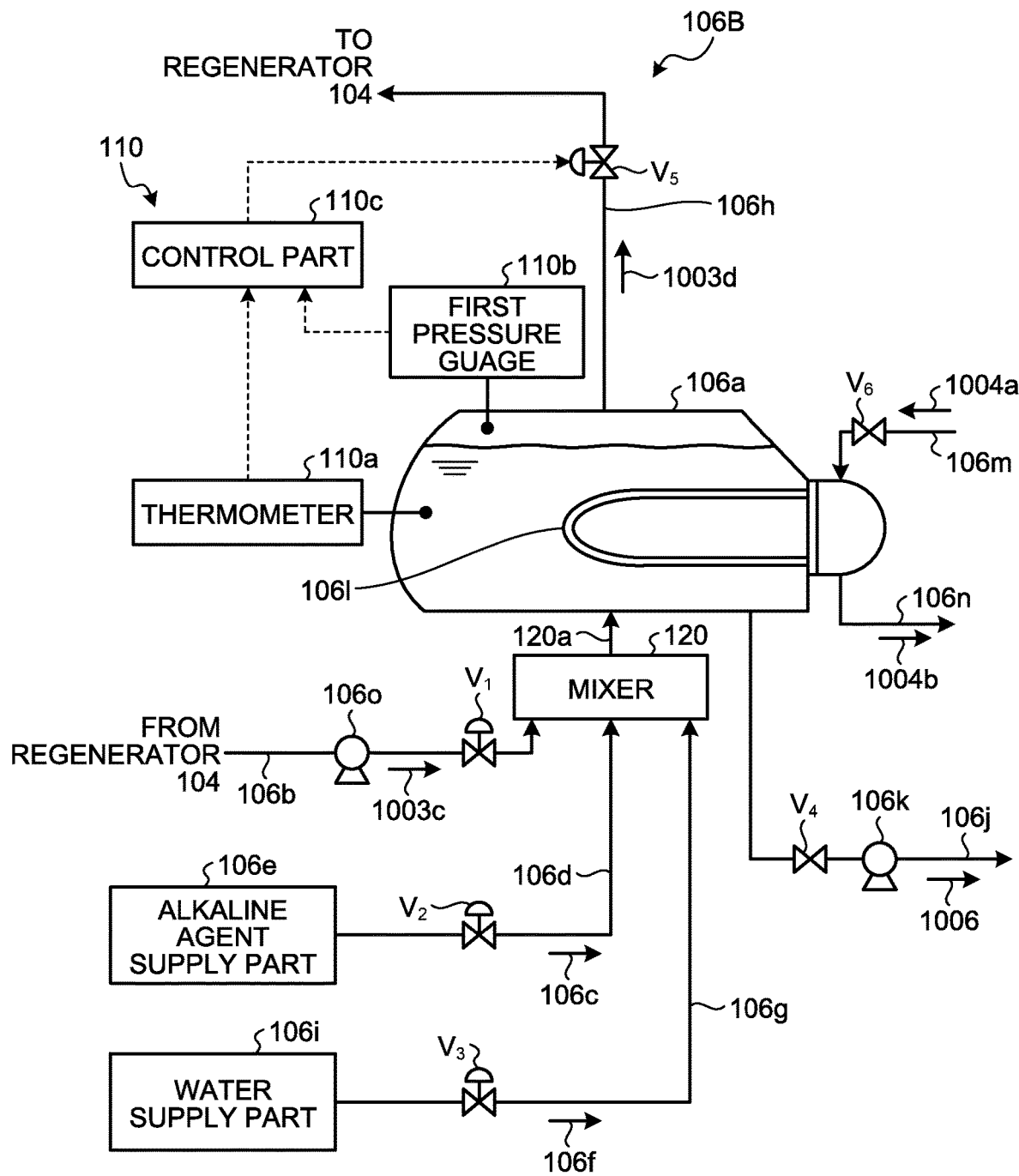
FIG. 6 is a schematic view of another reclaiming apparatus according to the first embodiment.

FIG. 6 is a schematic view of another reclaiming apparatus according to the first embodiment. In the reclaiming apparatus 106A illustrated in FIG. 2, the extracted lean liquid 1003c, the alkaline agent 106c, and the supply water 106f are supplied to the bottom part of the reclaimer 106a from the extraction pipe 106b, the alkaline agent supply pipe 106d, and the water supply pipe 106g, respectively. The present invention, however, is not limited to this configuration. For example, as illustrated in a reclaiming apparatus 106B in FIG. 6, the reclaiming apparatus may be configured by installing a mixer 120, connecting the extraction pipe 106b, the alkaline agent supply pipe 106d, and the water supply pipe 106g to the mixer 120, once introducing the extracted lean liquid 1003c, the alkaline agent 106c, and the supply water 106f into the mixer 120 to achieve an excellent mixing state, and thereafter introducing the mixed liquid into the bottom part of the reclaimer 106a from a mixed liquid supply tube 120a. In order to achieve more uniform mixing state, for example, a stirrer or the like may be used. This can prevent maldistribution of the mixing or the like at the time of separately introducing the alkaline agent 106c and promote separation of the amine-containing absorption component by the alkaline agent 106c.

Second Embodiment

Figure 7:
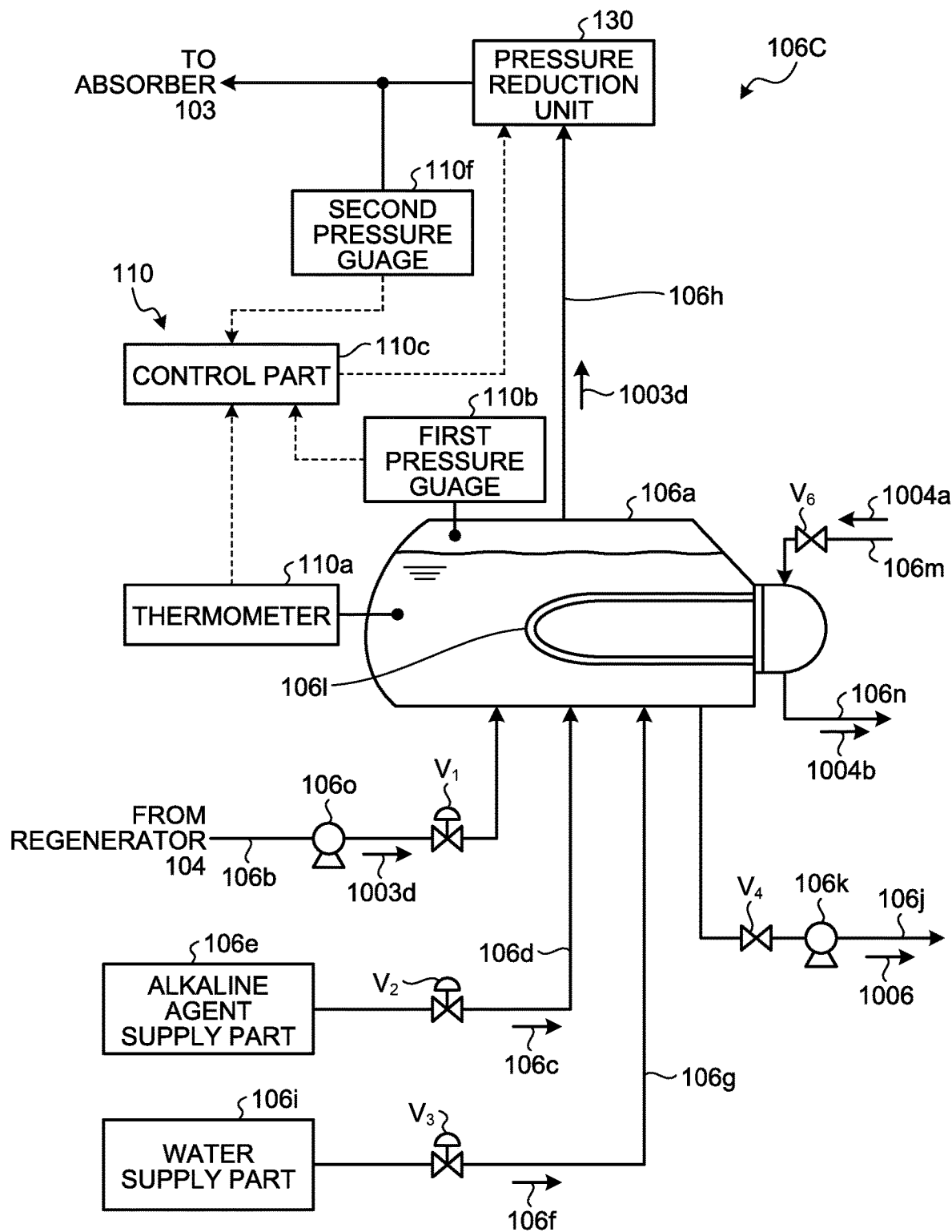
FIG. 7 is a schematic view of a reclaiming apparatus according to the first embodiment.

FIG. 7 is a schematic view of a reclaiming apparatus according to a second embodiment. For the same members as the members in the reclaiming apparatus described in Example 1, the same sign will be assigned and the overlapped description will be omitted. The reclaiming apparatus 106A illustrated in FIG. 2 is a pressurizing type reclaiming apparatus. However, the present invention is not limited to this, and may be a vacuum type reclaiming apparatus. The pressurizing type reclaiming apparatus is subject for the absorption component having a boiling point of, for example, 200° C. or less. However, absorption components having a high temperature boiling point of more than 200° C. exist. In the case where the absorption component having a high temperature boiling point is recovered, not the pressurizing type but the vacuum type reclaiming apparatus using a pressure reduction unit such as a vacuum pump is employed. The recovery agent having a high temperature boiling point is suitable in the case where acid components in a high-pressure process gas are removed. The reason why the vacuum type reclaiming apparatus is used is because the degradation of the absorption component is caused due to high temperature and use of high temperature steam is required and thus reclaiming cost is increased in the pressurizing type reclaiming apparatus, but the vacuum type reclaiming apparatus can prevent these problems.

As illustrated in FIG. 7, different from the pressurizing type reclaiming apparatus 106A in the first embodiment, the vacuum type reclaiming apparatus 106C is equipped with a pressure reduction unit 130 in the recovered steam discharge pipe 106h. At the discharge side of the pressure reduction unit 130, the pressure of the recovered steam 1003d discharged from the pressure reduction unit 130 is measured with a second pressure guage 110f.

Here, in the vacuum type reclaimer 106a in the present embodiment, the recovered steam 1003d discharged from the pressure reduction unit 130 may be introduced into either the absorber 103 or the regenerator 104 by controlling the degree of compression. Specifically, in the case where the compression ratio of the pressure reduction unit 130 at the time of recovering the recovered steam 1003d is 0.5 atm, the recovered steam 1003d is compressed to, for example, 1 atm for introducing the recovered steam 1003d into the absorber 103. For introducing the recovered steam 1003d into the regenerator 104, the recovered steam 1003d is compressed to, for example, 1.5 atm to 2.0 atm.

Figure 8:
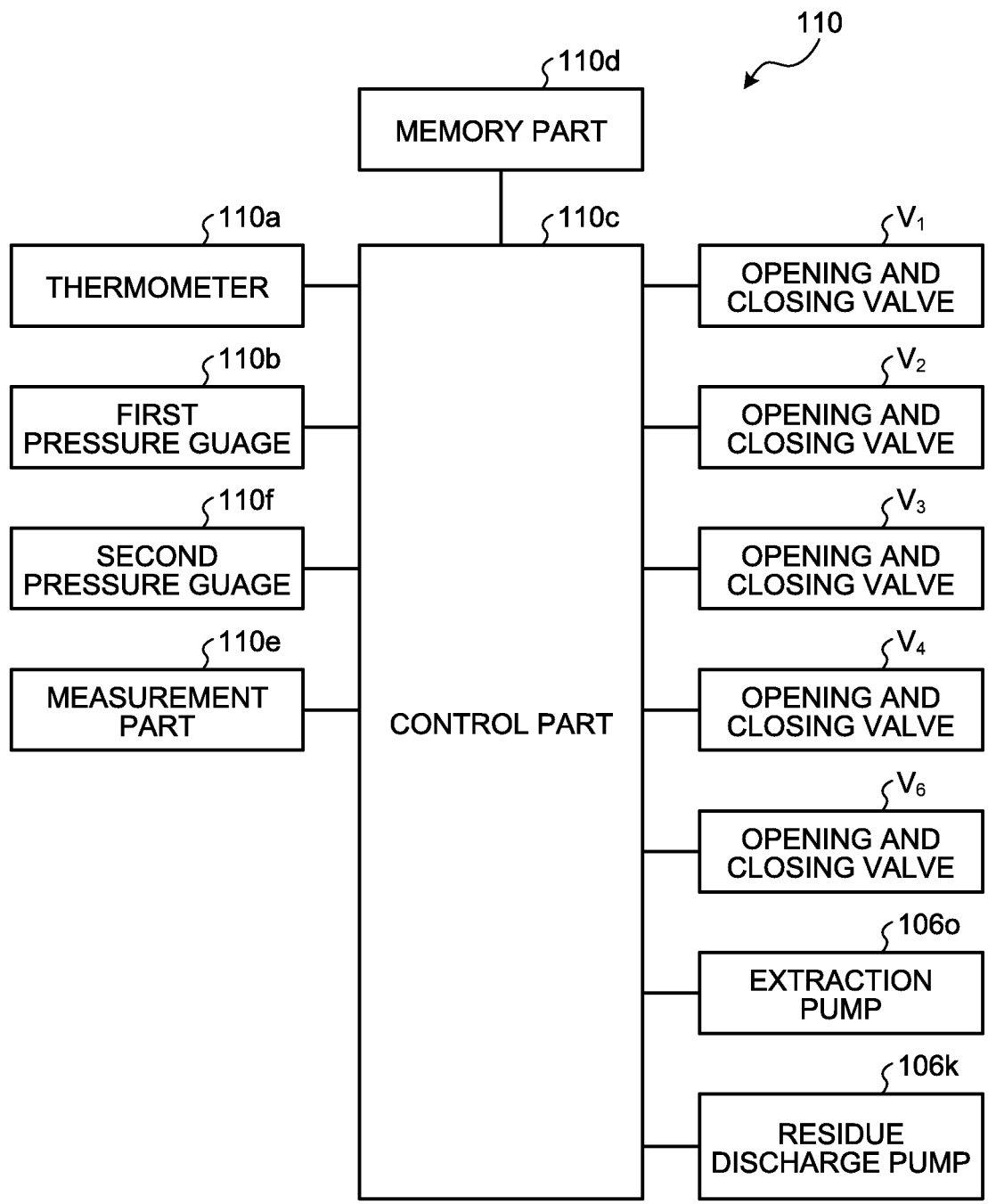
FIG. 8 is a block diagram of the control system of the reclaiming apparatus according to a second embodiment.

As illustrated in FIG. 8, the thermometer 110a, the first pressure guage 110b, the second pressure guage 110f, the measurement part 110e, the opening and closing valves $V_1$ to $V_4$ and $V_6$, and the pumps 106o and 106k are connected to the control part 110c. In accordance with the computer programs and data previously stored in the memory part 110d, the control part 110c comprehensively controls the above-described opening and closing valves $V_1$ to $V_4$ and $V_6$ and pumps 106o and 106k.

Figure 9:
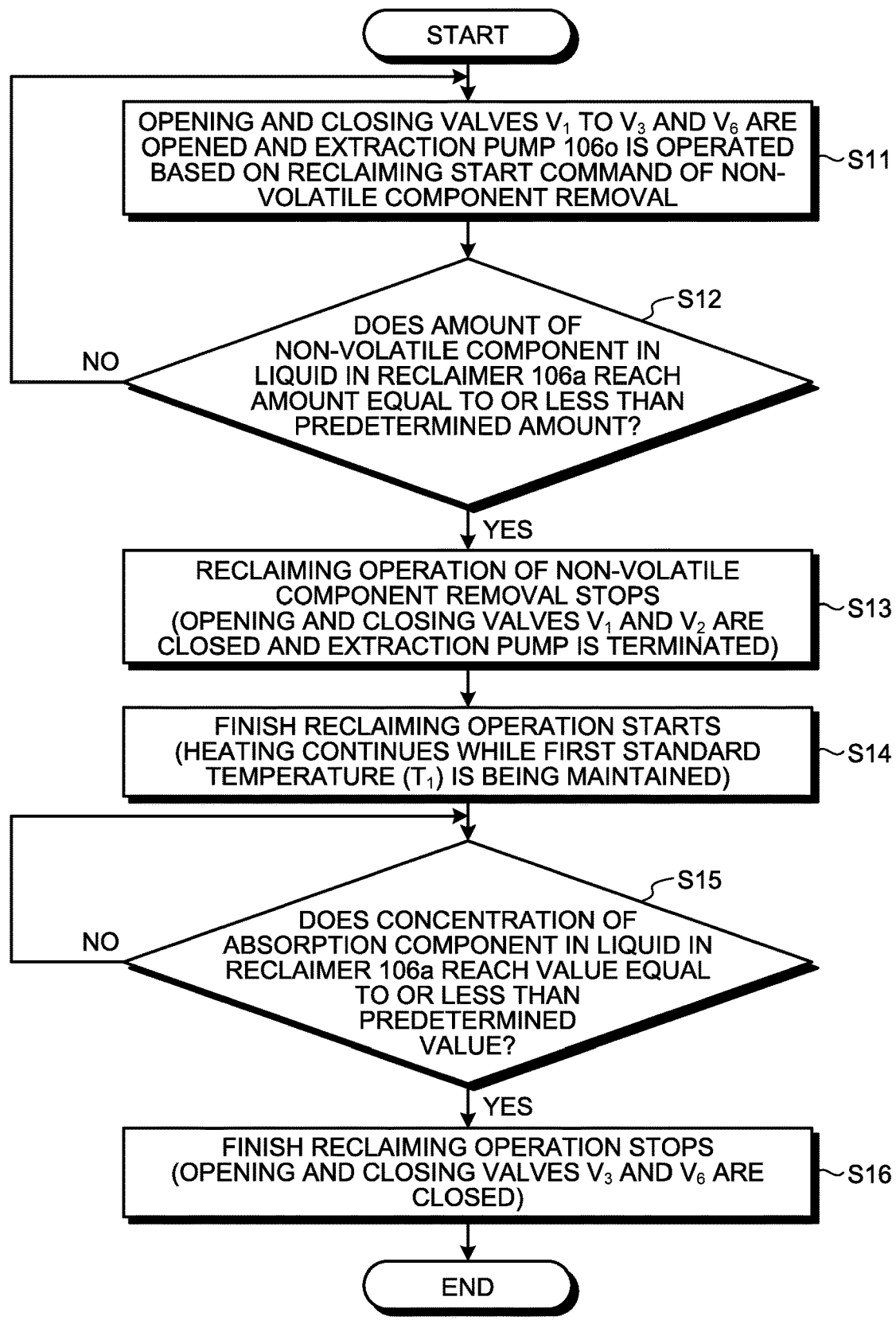
FIG. 9 is a flow chart of the control of the reclaiming apparatus according to the second embodiment.

As illustrated in FIG. 9, the control part 110c of the reclaiming apparatus 106C in the present embodiment opens the opening and closing valves $V_1$ to $V_3$ and $V_6$ and operates the extraction pump 106o based on the start command of the reclaiming for the non-volatile component removal (Step S11). This causes a part of the absorbing liquid 1003 to be introduced to and received in the reclaimer 106a as the extracted lean liquid 1003c from a part of the lean solution 1003a, the extracted lean liquid 1003c to be heated and vaporized together with the alkaline agent 106c and the supply water 106f and to be returned to the absorber 103 or the regenerator 104 as the recovered steam 1003d through the recovered steam discharge pipe 106h.

Thereafter, in the case where it is determined that the amount of the non-volatile component in the liquid in the reclaimer 106a reaches equal to or less than the predetermined amount to be removed based on the information of the removal of the non-volatile component input from the measurement part 110e and the non-volatile components (Yes at Step S12), the control part 110c closes the opening and closing valves $V_1$ and $V_2$ and terminates the extraction pump 106o to stop the reclaiming operation of the non-volatile component removal (Step S13). The concentration of the absorption component in the reclaimer 106a at the time of the stop of the reclaiming of the non-volatile component removal varies depending on the type of absorption component and the operating conditions of the absorbing unit. The concentration is preferably a concentration similar to the concentration of the lean solution 1003a circulating in the system (for example, 30% by weight to 60% by weight) or a slightly lower concentration than the concentration of the circulating lean solution 1003a from the viewpoint of absorption component recovery.

Subsequently, based on the start command of the finish reclaiming for absorption component recovery, the opening and closing valves $V_3$ and $V_6$ are kept open and heating is continued while the first standard temperature $T_1$ at the time of terminating the extraction of the extracted lean liquid 1003c is being maintained (Step S14).

The control part 110c controls the pressure inside the reclaimer 106a based on the first standard temperature $T_1$ in the reclaimer 106a.

Here, decrease in the absorption component amount remaining in the residue 1006 causes decrease in the absorption vapor pressure. At this time, the decrease in the absorption vapor pressure can be reduced by controlling the degree of compression (for example, 0.6 atm when the operation is carried out at 0.5 atm) so as to maintain the first standard temperature $T_1$ to increase the pressure. Here, the increase in the pressure is carried out by changing the degree of compression of the pressure reduction unit 130 based on the instruction from the control part 110c.

In this finish reclaiming operation, in the case where the concentration of the absorption component in the liquid in the reclaimer 106a reaches the predetermined concentration (for example, several percent by weight) or lower (Yes at Step S15), the opening and closing valves $V_3$ and $V_6$ are closed to stop the finish reclaiming operation (Step S16). After the finish reclaiming operation is stopped, the opening and closing valve $V_4$ is opened and the residue discharge pump 106k is operated to discharge the residue 1006 outside reclaimer 106a.

As described above, when the "finish reclaiming operation" that recovers the absorption component remaining after terminating the supply of the extracted lean liquid 1003c to the reclaimer 106a is carried out, 20% of the operation time required for recovering the absorption component in the residue 1006 in the reclaiming apparatus 106C to the same concentration (for example, 90% of the absorption component is recovered) can be reduced in the case where the pressure of the reclaimer 106a is controlled (the opening and closing valve $V_5$ is partially closed and the pressure is increased from $P_1$ to $P_2$) so that the temperature of the reclaimer 106a is maintained at the predetermined value (the first standard temperature $T_1$), as compared to the case where the constant pressure condition ($P_1$: constant) is used as in the related art without controlling pressure using the reclaimer temperature as a standard. The reason why the reduction ratio is improved as compared to the first embodiment is because, in the case where the absorption component having a high boiling point is recovered, the content ratio of the absorption component at the time of terminating the extraction of the extracted lean liquid 1003c is high and decrease in the content ratio of the remaining absorption component and the vapor pressure associated with the passage of the operation time is large and thus recovery efficiency is improved by controlling the pressure of the reclaimer 106a with the pressure reduction unit 130.

In the present embodiment, in the case where, after terminating the extraction of the extracted lean liquid 1003c, the pressure of the reclaimer 106a is controlled so that decrease in the temperature of the reclaimer 106a at the time of supply water or water washing part washing liquid and steam is within 10° C. as compared to the first standard temperature $T_1$, the reduction ratio of the operation time required for recovering the absorption component in the liquid in the reclaiming apparatus 106C to the same concentration is improved about three times or more as compared to the case where the pressure is controlled so that this temperature difference is 12° C.

Figure 10:
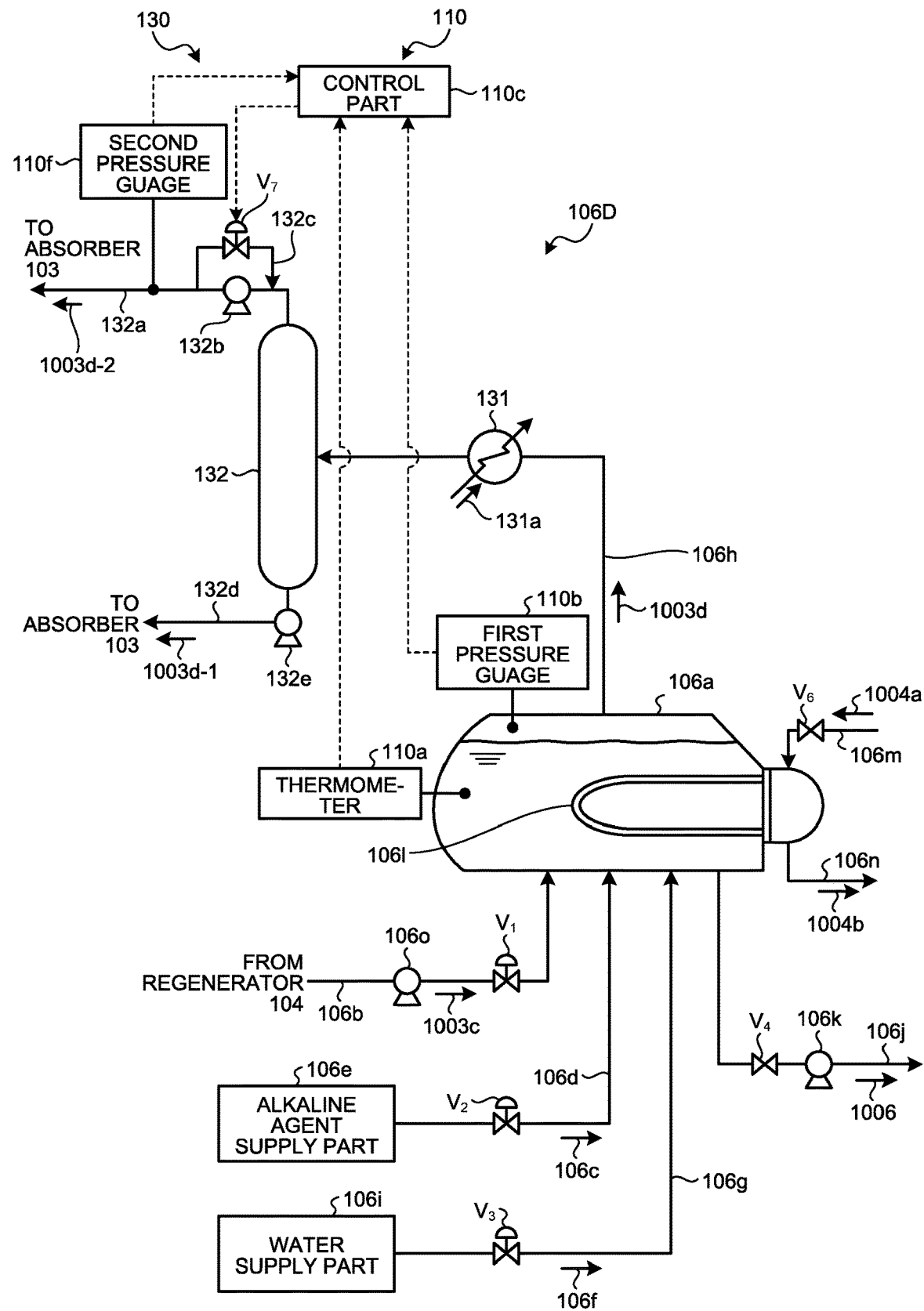
FIG. 10 is a schematic view of another reclaiming apparatus according to the second embodiment.

FIG. 10 is a schematic view of another reclaiming apparatus according to the second embodiment. In the reclaiming apparatus 106C illustrated in FIG. 7, the pressure of the whole amount of the recovered steam 1003d is reduced by the pressure reduction unit 130. However, the present invention is not limited thereto. When the pressure of the recovered steam 1003d is reduced by the pressure reduction unit 130, the reclaiming apparatus 106D of the present embodiment is equipped with a heat exchanger 131 and a gas-liquid separator 132 in the recovered steam discharge pipe 106h for discharging the recovered steam 1003d from the reclaimer 106a. The temperature of the recovered steam 1003d discharged from the reclaimer 106a and accompanied with the absorption component is lowered to, for example, 50° C. to 100° C. by the cooling water 131a of the heat exchanger 131 and thereafter the recovered steam 1003d is introduced to the gas-liquid separator 132 to be flashed. The introduced recovered steam 1003d is separated into condensed liquid 1003d-1 and condensed liquid-separated recovered steam gas 1003d-2 in the gas-liquid separator 132. The discharge line 132a of the condensed liquid-separated recovered steam gas 1003d-2 is equipped with a compressor 132b and an opening and closing valve $V_7$ interposed in a fine control line 132c for finely controlling the degree of compression of the compressor 132b. The condensed liquid 1003d-1 is discharged by the pump 132e installed in a condensed water line 132d.

In the present embodiment, the pressure of a large amount of the recovered steam 1003d is not required to be reduced by reducing pressure of the condensed liquid-separated recovered steam gas 1003d-2 formed by separating the condensed liquid 1003d-1 with the pressure reduction unit 130. Consequently, the operation energy of the pressure reduction unit 130 such as a compressor required for pressure reduction can be significantly reduced. Both of the condensed liquid 1003d-1 and the condensed liquid-separated recovered steam gas 1003d-2 from the recovered steam 1003d having normal pressure are introduced into the absorber 103.

According to the present embodiment, the operation time necessary for recovering the absorption component in the reclaimer residue to the same concentration can be reduced by controlling the pressure of the vacuum type reclaiming apparatus 106E and controlling the pressure of the reclaimer 106a so that the temperature of the reclaimer 106a is maintained at the predetermined standard temperature.

REFERENCE SIGNS LIST

101 Recovery Unit
103 Absorber
104 Regenerator
106A to 106D Reclaiming Apparatuses
106a Reclaimer
106b Extraction Pipe
106c Alkaline Agent
106d Alkaline Agent Supply Pipe
106e Alkaline Agent Supply Part
106f Supply Water
106g Water Supply Pipe
106h Recovered Steam Discharge Pipe
106i Water Supply Part
106j Residue Discharge Pipe
106k Residue Discharge Pump
106l Steam Pipe
106m Steam Supply Pipe
106n Condensed Water Discharge Pipe
106o Extraction Pump
110a Thermometer
110 Reclaimer Controller
110b First Pressure guage
110c Control Part
110d Memory Part
110e Measurement Part
1001 Flue Gas
1003a Lean Solution
1003b Rich Solution
1003c Extracted Lean Liquid
1003d Recovered Steam
1006 Reclaiming Residue
1004a Saturated Steam
1004b Steam Condensed Water
$T_1$ First Standard Temperature
$V_1$ to $V_7$ Opening and Closing Valves

The invention claimed is:

1. A reclaiming apparatus comprising:
a reclaimer configured to extract a lean solution that is a part of an acid gas absorbing liquid regenerated in a regenerator in a recovery unit that recovers acid gas components in gas with the acid gas absorbing liquid, and introduce and receive an extracted lean liquid;
an alkaline agent supply pipe configured to supply an alkaline agent to an inside of the reclaimer;
a water supply pipe configured to supply supply water to the inside of the reclaimer;
a recovered steam discharge pipe configured to introduce recovered steam discharged from the reclaimer into the regenerator;
a thermometer that measures temperature in the reclaimer;
a pressure guage configured to measure pressure in the reclaimer; and
a reclaimer controller configured to control pressure in the reclaimer so that temperature in the reclaimer at a timing of terminating introduction of the extracted lean liquid into the reclaimer is determined to be a standard temperature and the standard temperature is maintained when terminating the introduction of the extracted lean liquid into the reclaimer and further recovering an absorption component from a residue in the reclaimer.

2. The reclaiming apparatus according to claim 1, wherein,
in a case where pressure in the reclaimer reaches an upper limit pressure value of operation upper limit of the reclaimer,
the reclaimer controller is configured to change a target standard temperature to be lower than the standard temperature and control the pressure in the reclaimer so that the changed standard temperature is maintained.

3. The reclaiming apparatus according to claim 2, wherein the change in the target standard temperature is determined to be a lower temperature range within a predetermined temperature from the standard temperature in the reclaimer at the time of terminating the introduction of the extracted lean liquid into the reclaimer.

4. The reclaiming apparatus according to claim 1, wherein in a case of a pressurizing type reclaimer, the pressure in the reclaimer is controlled by installing a throttle valve in the recovered steam discharge pipe and controlling the throttle valve.

5. The reclaiming apparatus according to claim 1, wherein in the case of a vacuum type reclaimer, the pressure in the reclaimer is controlled by controlling a pressure reduction unit installed in the recovered steam discharge pipe.

6. A method for reclaiming comprising:
reclaiming of removing non-volatile components including extracting lean liquid that is a part of an acid gas absorbing liquid regenerated in a regenerator in a recovery unit that recovers acid gas components in gas with the acid gas absorbing liquid, continuously introducing the extracted lean liquid into a reclaimer and receiving the extracted lean liquid, introducing an alkaline agent and supply water and heating, and removing the non-volatile components in the extracted lean liquid while recovering remaining absorption component from the extracted lean liquid as recovered steam;

terminating introduction of the extracted lean liquid into the reclaimer; and finish reclaiming of controlling pressure in the reclaimer so that temperature in the reclaimer at a time of terminating the introduction of the extracted lean liquid into the reclaimer is determined to be a standard temperature and the standard temperature is maintained when the absorption component is further recovered from a residue in the reclaimer.

* * * * *